United States Patent
Kollmannsberger et al.

(10) Patent No.: US 12,448,062 B2
(45) Date of Patent: Oct. 21, 2025

(54) TUGGER TRAIN TRAILER

(71) Applicant: LR Intralogistik GmbH, Woerth an der Isar (DE)

(72) Inventors: Josef Kollmannsberger, Volkenschwand (DE); Michael Zimmer, Ergolding (DE)

(73) Assignee: LR Intralogistik GmbH, Woerth an der Isar (DE)

( * ) Notice: Subject to any disclaimer, the term of this patent is extended or adjusted under 35 U.S.C. 154(b) by 623 days.

(21) Appl. No.: 17/801,938

(22) PCT Filed: Feb. 3, 2021

(86) PCT No.: PCT/EP2021/052479
§ 371 (c)(1),
(2) Date: Aug. 24, 2022

(87) PCT Pub. No.: WO2021/170356
PCT Pub. Date: Sep. 2, 2021

(65) Prior Publication Data
US 2023/0084953 A1    Mar. 16, 2023

(30) Foreign Application Priority Data

Feb. 28, 2020   (DE) .................... 10 2020 105 370.3

(51) Int. Cl.
| | | |
|---|---|---|
| B62D 53/00 | (2006.01) | |
| E05B 47/00 | (2006.01) | |
| E05B 65/00 | (2006.01) | |

(52) U.S. Cl.
CPC ........ B62D 53/005 (2013.01); E05B 47/0012 (2013.01); E05B 65/00 (2013.01);
(Continued)

(58) Field of Classification Search
CPC ... B62D 53/005; E05B 47/0012; E05B 65/00; E05B 2047/0017; E05B 2047/0067
(Continued)

(56) References Cited

U.S. PATENT DOCUMENTS

| | | | |
|---|---|---|---|
| 11,214,439 B2* | 1/2022 | Knepp | ................. B65G 1/1375 |
| 12,043,307 B2* | 7/2024 | Wulf | ....................... B60D 1/62 |

(Continued)

FOREIGN PATENT DOCUMENTS

| | | |
|---|---|---|
| EP | 2439124 A2 | 4/2012 |
| EP | 2805852 A2 | 11/2014 |

(Continued)

*Primary Examiner* — Jacob D Knutson
*Assistant Examiner* — Mohamed M Medani
(74) *Attorney, Agent, or Firm* — The Webb Law Firm

(57) ABSTRACT

A tugger train trailer (1) with a chassis (2) and a transport device (7) is disclosed and configured to hold at least one cargo carrier (LT) having rollers (R), wherein the tugger train trailer (1) is provided with at least one locking means (20) that secure the received cargo carrier (LT) in the transverse direction (Q) of the vehicle of the tugger train trailer (1). The locking means (20) has a locking element (21*a*; 21*b*) that can be electro-mechanically actuated between a locked position and an unlocked position, wherein the locking element (21*a*; 21*b*) is actuated by a spring device (30) toward the locked position and by means of an electric drive device into the unlocked position.

21 Claims, 7 Drawing Sheets

(52) U.S. Cl.
CPC ............... *E05B 2047/0017* (2013.01); *E05B 2047/0067* (2013.01)

(58) Field of Classification Search
USPC ...................................... 280/411.1
See application file for complete search history.

(56) References Cited

U.S. PATENT DOCUMENTS

| | | | |
|---|---|---|---|
| 2015/0225007 A1* | 8/2015 | Knepp ................. | B62D 53/005 |
| | | | 280/47.18 |
| 2017/0021754 A1* | 1/2017 | Berghammer ............ | B60P 1/43 |
| 2023/0084953 A1* | 3/2023 | Kollmannsberger ....................... | |
| | | | E05B 47/0012 |
| | | | 280/411.1 |

FOREIGN PATENT DOCUMENTS

| | | | | | |
|---|---|---|---|---|---|
| EP | 3126190 | B1 | | 2/2018 | |
| EP | 2808234 | B1 | * | 12/2018 | ............... B62B 3/06 |
| ES | 2566172 | T3 | * | 4/2016 | ............... B60J 7/104 |
| WO | WO-2013041108 | A1 | * | 3/2013 | ........... B62D 53/085 |

* cited by examiner

TUGGER TRAIN TRAILER

CROSS-REFERENCE TO RELATED APPLICATIONS

This application is the United States national phase of International Application No. PCT/EP2021/052479 filed Feb. 3, 2021, and claims priority to German Patent Application No. 10 2020 105 370.3 filed Feb. 28, 2020, the disclosures of which are hereby incorporated by reference in their entirety.

BACKGROUND OF THE INVENTION

Field of the Invention

The invention relates to a tugger train trailer with a chassis and a transport device to receive at least one cargo carrier having rollers, wherein the tugger train trailer is provided with at least one locking means that secures the received cargo carrier in the transverse direction of the vehicle of the tugger train trailer.

Description of Related Art

Tugger trains are used with increasing frequency for the internal transport of loads, for example in the production departments of production plants. They consist of a tow vehicle such as a tractor, for example, and a plurality of tugger train trailers which are attached to the tractor and on which the cargo is transported.

EP 3 126 190 B1 describes a tugger train trailer of the prior art which is provided with locking means that secure a received cargo carrier in the transverse direction of the vehicle of the tugger train trailer. In this case the locking means are purely mechanically actuated and are in the form of pawls over which the cargo carriers passes. As the cargo carrier is pushed onto the tugger train trailer, the cargo carrier passes over the pawls, whereupon the pawls are pushed downward by the cargo carriers into an unlocked position. One disadvantage of purely mechanically actuated locking means of this type is that for the actuation of the locking means into the unlocked position, an operator pushing the cargo carrier must apply an additional thrust to the cargo carrier to actuate the locking means into the unlocked position as the cargo carrier passes over them. The additional thrust that must be applied to the cargo carrier has an adverse effect on the ease of operation as the cargo carriers are pushed onto the tugger train trailer. The locking means of the prior art described in EP 3 126 190 B1 are also complex, time-consuming and expensive to construct and have a great many components, as a result of which the locking means described in EP 3 126 190 B1 occupy a lot of space in the tugger train trailer and are prone to malfunctions.

Furthermore, it is known that purely electrically actuated locking means can be provided on tugger train trailers that secure a cargo carrier in the transverse direction of the vehicle of the tugger train trailer. With purely electrically actuated locking means, before a cargo carrier is pushed into the tugger train trailer, an operator must perform an unlocking of the locking means, and after the cargo carrier has been pushed into the tugger train trailer, a locking of the locking means, during which time the operator must hold the cargo carrier in the correct position. To secure the cargo carrier, the operator must therefore perform two work steps, namely holding the cargo carrier in the correct position and simultaneously performing the locking of the locking means. As a result, the entire process of locking the cargo carrier after it has been pushed into place is inefficient and not user-friendly. Additionally, purely electrically actuated locking means result in longer process times because the time required for the locking of the cargo carrier after it has been slid into place is in addition to the time required to slide the cargo carrier into the tugger train trailer.

SUMMARY OF THE INVENTION

The object of the present invention is to make available a tugger train trailer of the type described above which is improved with regard to efficiency and user-friendliness as a cargo carrier is slid in or pushed on and locked in place.

The invention accomplishes this object in that the locking means have a locking element that can be electro-mechanically actuated between a locked position and an unlocked position, wherein the locking element is actuated by a spring device toward the locked position and by means of an electric drive device into the unlocked position. The teaching of the invention is therefore to provide an electromechanical locking of the cargo carrier on the tugger train trailer, in which the unlocking process takes place electrically by means of the electric drive device and the locking process takes place mechanically by means of the spring device. The actuation of the locking element into the unlocked position by means of the electric drive device improves the ease of operation as the cargo carrier is being slid into the tugger train trailer because no additional thrust needs to be applied to the cargo carrier by the operator to actuate the locking means into the unlocked position as the cargo carrier passes over them. The actuation of the locking element into the locked position by means of the spring device improves the ease of operation as the cargo carrier is being slid into the tugger train trailer, because the operator is not required to perform the additional work step of actuating the locking element into the locked position.

According to one advantageous embodiment of the invention, the locking element has a locking pawl which is located on a shaft mounted so that it can swivel around a swiveling axis. With a rotationally mounted locking pawl of this type, it is possible in a simple manner, by rotating the shaft, to actuate the locking pawl between the unlocked position and the locked position.

In one advantageous embodiment of the invention, the swiveling axis of the shaft is oriented in the transverse direction of the vehicle. This makes possible a space-saving location of the locking means between the rollers of a cargo carrier received on the tugger train trailer.

The spring device is advantageously a torsion spring, in particular a helical spring, located on the shaft. With a torsion spring of this type, the shaft can be actuated in a simple and space-saving manner and the locking pawl can be actuated toward the locked position.

According to one advantageous embodiment of the invention, the locking element has an actuator lever located on the shaft, which can be actuated by means of the electric drive device. It thereby becomes possible, in a simple manner, for the electric drive device to actuate the shaft and to actuate the locking pawl into the unlocked position According to one advantageous embodiment of the invention, the electric drive device has an actuator pawl located on a drive shaft of the drive device, with which the shaft of the locking element, in particular the actuator lever of the locking element, can be actuated. With an actuator pawl of this type, the actuator lever of the locking element can be actuated in a simple manner by the electric drive device, and thus the shaft of the locking element is actuate to actuate the locking element with the electric drive device into the unlocked position.

For this purpose, the actuator pawl can advantageously be swiveled by the drive device between a starting position and an actuation position, whereby in the starting position of the actuator pawl, the locking element can be actuated by means of the spring device into the locked position, and in the actuation position of the actuator pawl, the locking element is in the unlocked position. With the drive device, it is therefore possible in a simple manner to actuate the locking element into the unlocked position.

In one advantageous embodiment of the invention, the drive shaft of the drive device is oriented parallel to the shaft of the locking element. This results in a space-saving construction of the locking means.

According to one advantageous development of the invention, the actuator pawl is provided with a rotatable actuator roller, with which the actuator lever of the locking element can be actuated. With the rotatable actuator roller, a low level of friction is achieved between the actuator roller and the actuator lever of the locking element, so that a small electric drive device can be provided.

According to one preferred embodiment of the invention, the locking pawl is in the shape of a circular arc. When the locking pawl has a shape of this type, it is possible in a simple manner to prevent the locking pawl from getting caught on the cargo carrier, so that a high degree of functional reliability of the locking means is achieved.

According to one advantageous development of the invention, the locking means has two locking elements which are associated with opposite sides of the vehicle. With locking means of this type, on a tugger train trailer that can be loaded or unloaded with a cargo carrier from both sides of the vehicle, a received cargo carrier can be secured in the transverse direction of the vehicle in a simple manner.

It is particularly advantageous if, according to one development of the invention, the two locking elements can be actuated by means of an electric drive device into the respective unlocked position. For the actuation of the two locking elements into the unlocked position, therefore, only one single electric drive device is necessary, as a result of which a simpler construction with only a few components and a space-saving design of locking means comprising two locking elements can be achieved.

In an advantageous configuration of the invention, the shafts of the two locking elements are located at some distance from each other, wherein the drive shaft of the drive device is located in the middle between the shafts of the locking elements. This makes it possible, in a simple manner, by a rotational movement of the drive shaft of the drive device in a first direction of rotation, to actuate one of the two locking elements into the unlocked position, and by a rotational movement of the drive shaft of the drive device in a second, opposite direction of rotation, to actuate the other of the two locking elements into the unlocked position. As an additional result, a high degree of operational reliability is achieved, because only one of the two locking elements can be actuated into the unlocked position by the electric drive unit, so that a mistaken loading of the cargo carrier from the incorrect side of the vehicle of the tugger train trailer or a mistaken unloading of the cargo carrier on the incorrect side of the vehicle of the tugger train trailer can be reliably prevented.

For the actuation of the locking means into the unlocked position, according to one advantageous configuration of the invention, a control element, in particular a momentary-contact switch, is provided, wherein the electric drive device is controlled as a function of the control element so that the electric drive device actuates the locking element into the unlocked position when the control element is actuated. With a control element of this type, the operator can in a simple manner actuate the locking element into the unlocked position.

For this purpose, the electric drive device is controlled by the control element so that when the control element is actuated, the electric drive swivels an actuator pawl into the actuation position. By swiveling the actuator pawl into the actuation position, the locking element is actuated into the unlocked position, so that the unlocking process can be performed in a simple manner by means of the electric drive device.

For the actuation of the locking means into the locked position, according to one advantageous configuration of the invention, a sensor device is provided for the detection of an insertion position of the cargo carrier, wherein the electric drive device is controlled as a function of the sensor device so that when the fully inserted position is reached, the locking element can be actuated by means of the spring device toward the locked position. The locking process is therefore triggered by the insertion of the cargo carrier and by the cargo carrier reaching a certain insertion position, which can be detected in a simple manner with a sensor device.

For this purpose, the electric drive device is controlled by the control element so that when the insertion position is reached, the electric drive swivels an actuator pawl into the starting position. By swiveling the actuator pawl into the starting position, the locking element is actuated by means of the spring device into the locked position, so that the locking process can be performed in a simple manner mechanically by means of the spring device.

In one advantageous embodiment of the invention, the sensor device is a photoelectric barrier. With a photoelectric barrier, when a cargo carrier is slid into place, a specified insertion position of the cargo carrier can be reliably determined in a contactless manner, in response to which the electric drive device swivels the actuator pawl back into the starting position.

According to one advantageous development of the invention, the sensor device is centrally located in the transverse direction of the vehicle. This results in particular advantages, because as soon as the cargo carrier is inserted halfway into the tugger train trailer, the electric drive device swivels the actuator pawl back into the starting position, so that then, if the cargo carrier is inserted all the way into the tugger train trailer, the locking element can be actuated by the spring device into the locked position, to secure the cargo carrier that has just been received. This results in fast process times, because the time required for the actuator pawl to pivot back into the starting position under the control of the electric drive device is simultaneous with the time it takes to slide in the cargo carrier. Additionally, as a result of this location of the sensor device, on a tugger train trailer that can be loaded from both sides of the vehicle, trigger signals can be generated for both locking elements located on opposite sides of the vehicle with only one sensor device in the middle of the vehicle of the tugger train trailer.

In one advantageous configuration of the invention, to receive the at least one cargo carrier, the tugger train trailer has a transport device, in particular a transport device that can be raised and lowered with respect to the chassis. With a transport device, it becomes possible in a simple manner to receive one or more cargo carriers and transport them on the tugger train trailer. If the transport device can be raised and lowered, it becomes possible in a simple manner, when the transport device is lowered, to insert the cargo carriers on their rollers into the tugger train trailer. During the transport of the cargo carriers in the tugger train trailer, the transport device is in the raised position, so that the cargo carriers received are lifted and are not running on their own rollers.

According to an advantageous embodiment of the invention, the transport device has a platform onto which the rollers of the cargo carrier can be driven. The cargo carriers are therefore supported on the platform with their rollers. On a transport device of this type having a platform, one or more cargo carriers can therefore be pushed on with their rollers in a simple manner and transported in the tugger train trailer.

For this purpose, the locking means are advantageously located on the platform. The locking means can be located in a simple and space-saving manner on the platform and make it possible in a reliable manner to secure a received cargo carrier in the transverse direction of the vehicle of the tugger train trailer.

The invention further relates to a system comprising a tugger train trailer according to the invention and at least one cargo carrier having rollers, wherein the cargo carrier has a contact face on the underside for the locking element. If, even as soon as when the cargo carrier is pushed halfway into the tugger train trailer, the electric drive device swivels the actuator pawl back into the starting position, the locking element is actuated by the spring device toward the locked position. The locking element thereby comes into contact with the contact face on the underside of the cargo carrier, and as the cargo carrier is pushed in further, slides along the contact face. If the cargo carrier has been pushed all the way into the tugger train trailer, the locking element is no longer in any contact with the contact face so that the locking element can be actuated by the spring device into the locked position to secure the cargo carrier received.

The tugger train trailer according to the invention has a series of advantages.

The tugger train trailer according to the invention is provided with an electromechanical locking of the cargo carrier, in which the unlocking process takes place electrically and the locking process takes place mechanically.

As a result of the electric unlocking, wherein the locking element is actuated by the electric drive device into the unlocked position, no additional force needs to be applied by the operator during the sliding of a cargo carrier into the tugger train trailer to actuate the locking element into the unlocked position. In connection with the corresponding control element, on a tugger train trailer with a plurality of positioning channels for a plurality of cargo carriers, it can further be reliably determined which positioning channel is to be used to load or unload a cargo carrier.

As a result of the mechanical, spring-loaded lock, wherein the locking element is actuated by the spring device into the locked position, the cargo carrier being inserted is immediately locked when it reaches the safely loaded position. In addition, the mechanical lock means that the locking means are highly fail-safe, because in the locked position of the locking means the spring device is in the unloaded position, and a failure of the electric drive device in the locked position of the locking means has no effect on the function of the locking means.

Furthermore, with the locking means according to the invention, it becomes possible, in the event of a failure of the electric drive device, to remove a cargo carrier that has been received, because the shaft of the locking element can easily be rotated manually to actuate the corresponding locking pawl into the unlocked position.

Additionally, in contrast to a purely electric lock, with the lock according to the invention, the time to lock the cargo carrier runs simultaneously with the time to slide in the cargo carrier, so that shorter process times are achieved.

If the tugger train trailer is provided with locking means on both vehicle sides, to make possible a loading and unloading of the tugger train trailer with cargo carriers from both sides, the two locking means can be actuated in a simple manner with a single electrical drive device.

Additionally, it is possible by a corresponding configuration of the locking pawls to lock cargo carriers with different ground clearances.

BRIEF DESCRIPTION OF THE DRAWINGS

Additional advantages and details of the invention are explained in greater detail below with reference to the exemplary embodiment illustrated in the accompanying schematic drawings, in which.

DESCRIPTION OF THE INVENTION

Figure 1:
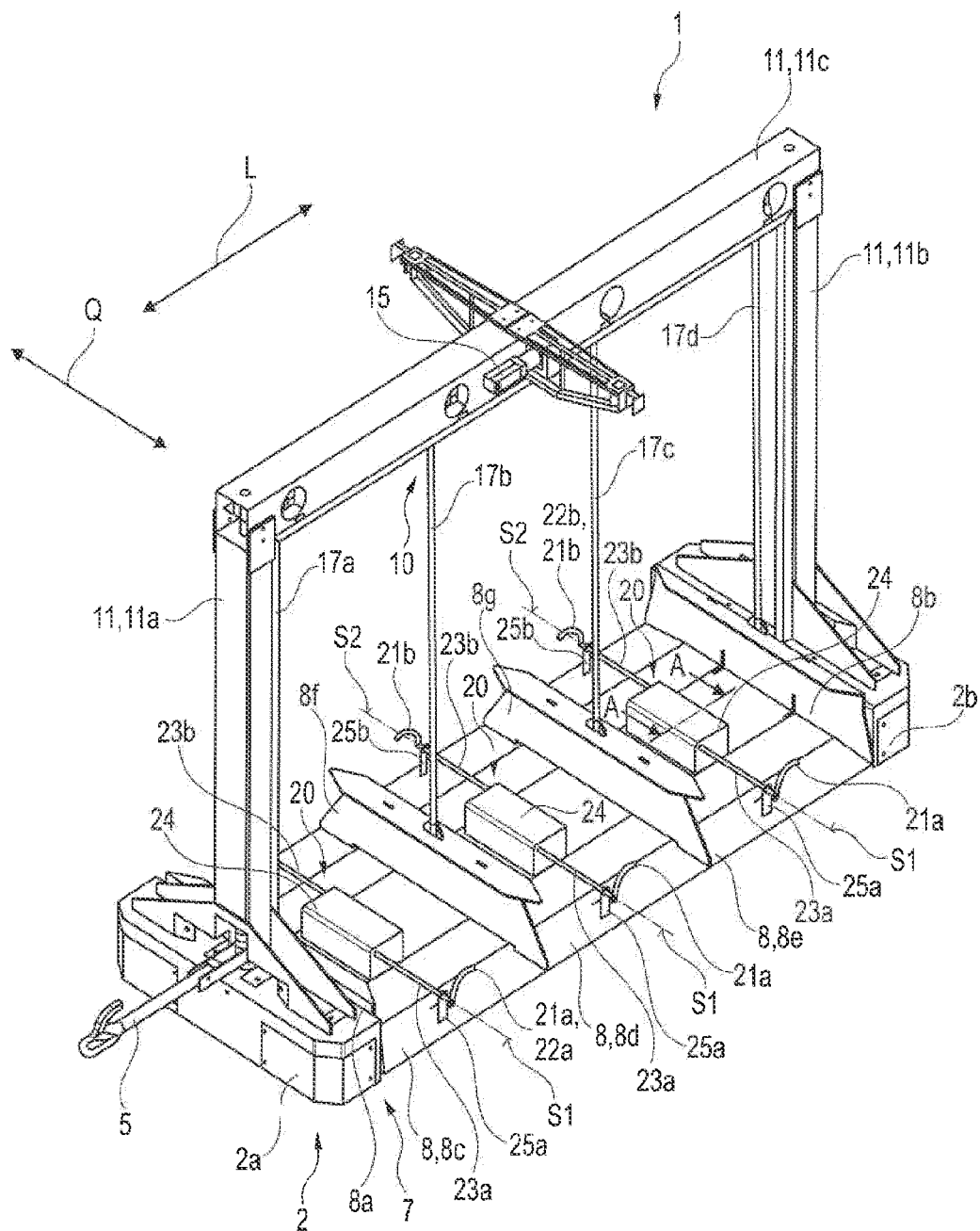
FIG. 1 is a view in perspective of a tugger train trailer according to the invention with locking means according to the invention.

FIGS. 1 to 4 show a tugger train trailer 1 according to the invention of a tugger train.

The tugger train trailer 1 has a chassis 2 which has two axle modules 2a, 2b located at some distance from each other in the longitudinal direction L of the vehicle. The axle module 2a is in the form of a front axle module and is provided with front wheels 3. The axle module 2b is in the form of a rear axle module and is provided with rear wheels 4. Located on the axle module 2a is a steerable tiller 5 with which the tugger train trailer 1 can be attached to a tractor vehicle or to a preceding tugger train trailer of the tugger train. The axle module 2b is equipped with a trailer coupling 6, to which an additional tugger train trailer of the tugger train can be attached. The front wheels 3 and/or the rear wheels 4 can be steered. If both the front wheels 3 and the rear wheels 4 are steered, the steering movement of the front wheels and the steering movement of the rear wheels can be coupled.

Between the axle module 2a and the axle module 2b, cargo carriers not illustrated in any further detail in FIGS. 1 to 4 can be loaded and carried. To receive the cargo, the tugger train trailer 1 in the illustrated exemplary embodiment has a transport device 7 which is located between the two axle modules 2a, 2b.

In the illustrated exemplary embodiment, the transport device 7 can be raised and lowered with respect to the chassis 2 formed by the axle modules 2a, 2b by means of a lift device 10. For the vertical guidance of the transport device 7, a vertical guide, not shown in any further detail, is provided between the transport device 7 and the axle module 2a and between the transport device 7 and the axle module 2a respectively.

In the illustrated exemplary embodiment, the transport device 7 has a platform 8 for driving on cargo carriers, which are not illustrated in any detail and are equipped with rollers, and which are supported with their rollers on the platform 8. In the illustrated exemplary embodiment, the platform 8 extends in the transverse direction Q of the vehicle over the entire width of the vehicle, so that the cargo carriers equipped with rollers can be pushed up onto and down off the platform 8 from both sides of the vehicle. In the illustrated exemplary embodiment, the platform 8, in the vicinity of the axle module 2a, has a vertical transverse plate 8a that runs in the transverse direction Q of the vehicle, and is guided in the vertical direction by means of a vertical guide on the axle module 2a. In the illustrated exemplary embodiment, the platform 8, in the vicinity of the axle module 2b, has a vertical transverse plate 8b that runs in the transverse direction Q of the vehicle, and is guided in the vertical direction by means of a vertical guide on the axle module 2b.

In the illustrated exemplary embodiment—viewed in the longitudinal direction L of the vehicle—has three positioning channels 8c, 8d, 8e, into each of which a cargo carrier can be driven. Between the front positioning channel 8c and the middle positioning channel 8d, there is a vertical partition web 8f that runs in the transverse direction Q of the vehicle. Accordingly, between the middle positioning channel 8d and the rear positioning channel 8e, there is a vertical partition web 8g that runs in the transverse direction Q of the vehicle.

Figure 2:
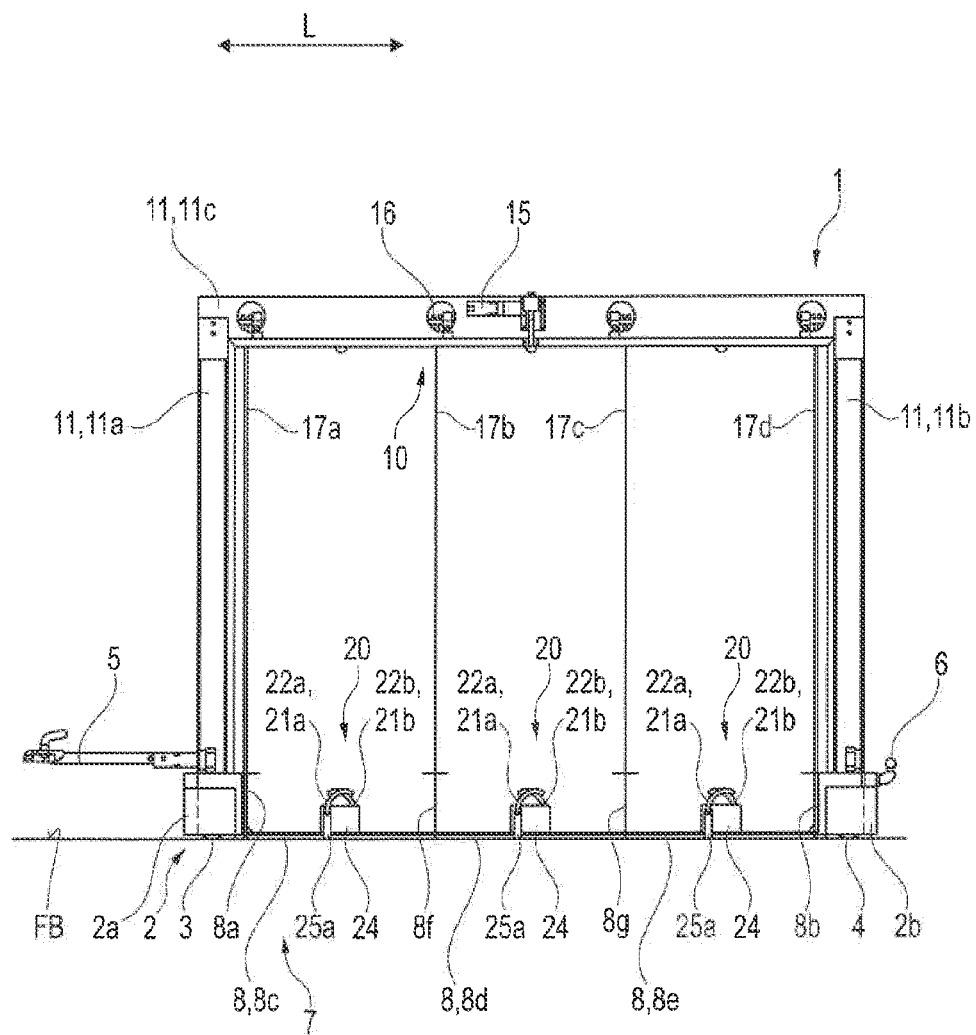
FIG. 2 is a side view of the tugger train trailer from FIG. 1 in a lowered position of a transport device.
Figure 3:
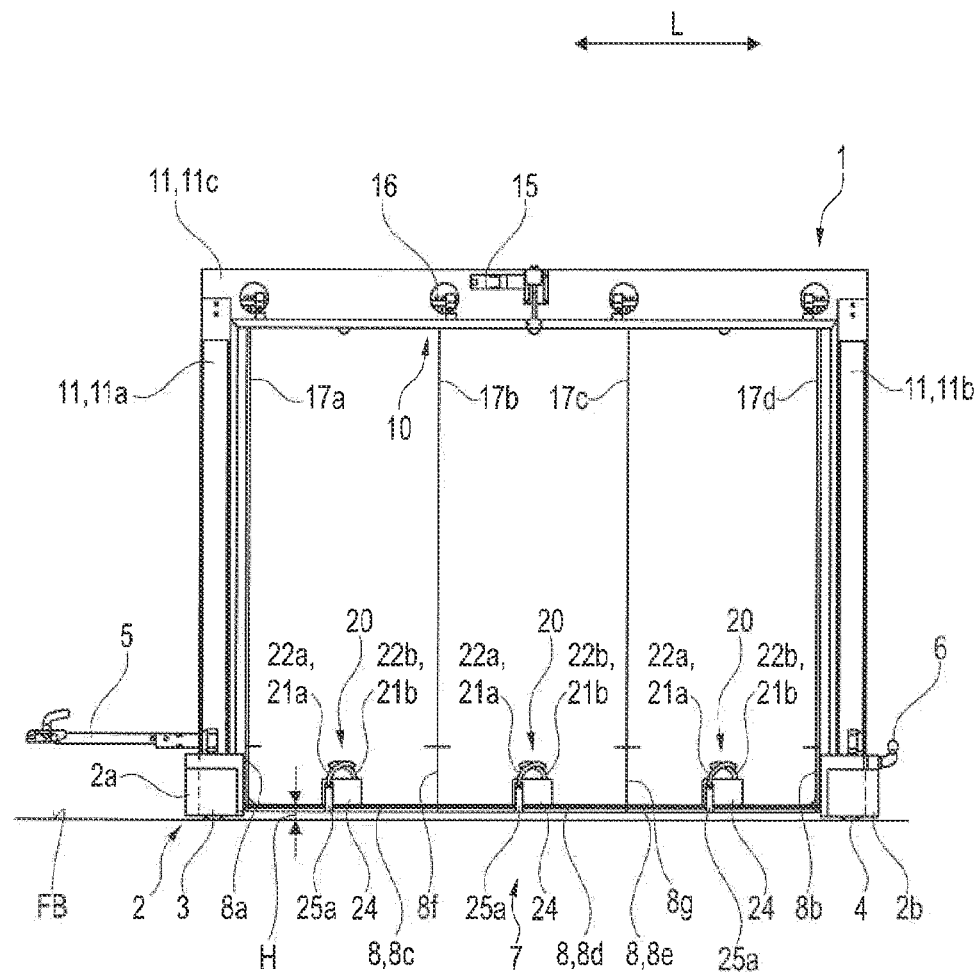
FIG. 3 shows the tugger train trailer from FIG. 2 with the transport device in the raised position.

In FIG. 2, the transport device 7 is shown in the lowered position and thus in the bottom end-of-travel position, in which the platform 8 is lowered to the roadway FB so that the cargo carriers with their rollers can be pushed into the positioning channels 8c, 8d and 8e of the platform 8. FIG. 3 shows the transport device 7 in the raised position and thus in the upper end-of-travel position, in which the platform 8 is lifted from the roadway surface FB by means of the lift device 10 by the travel distance H.

In the illustrated exemplary embodiment, the tugger train trailer 1 further has a U-shaped bridge-type frame 11—seen in a side view—that connects the axle modules 2a, 2b. The bridge-type frame 11 consists of a vertical support 11a located on the axle module 2a, a vertical support 11b located on the axle module 2b and a longitudinal beam 11c connecting the vertical supports 11a, 11b. The bridge-type frame 11—viewed in the transverse direction Q of the vehicle—is centrally located.

In the illustrated exemplary embodiment, the lifting device 10 with which the transport device 7 can be raised and lowered has a lifting shaft 16 driven by means of a drive motor 15, such as an electric motor, for example, which is rotatably mounted in the longitudinal beam 11c, which is in the form of a tubular profile, of the bridge frame 11. With the lifting shaft 16, it is possible to raise and lower a plurality of lifting linkages 17a, 17b, 17c, 17d which are fastened with their lower ends to the transport device 7.

The tugger train trailer 1 is provided with at least one locking means 20 which secures the loaded cargo carriers in the transverse direction Q of the vehicle of the tugger train trailer 1.

In the illustrated exemplary embodiment, each positioning channel 8c, 8d, 8e is provided with locking means 20.

In the illustrated exemplary embodiment, in which the tugger train trailer 1 can be loaded and unloaded with cargo carriers from both sides, each locking means 20 has two locking elements 21a, 21b, which are assigned to the opposite sides of the vehicle of the tugger train trailer 1. The locking elements 21a are located on the left side of the vehicle and the locking elements 21b are located on the right side of the vehicle.

Each locking element 21a, 21b has a locking pawl 22a, 22b which is located on a shaft 23a, 23b mounted so that it can swivel around a swiveling axis S1, S2.

The swiveling axes S1, S2 of the shafts 23a, 23b are each oriented in the transverse direction Q of the vehicle of the tugger train trailer 1.

The shafts 23a, 23b are each mounted in a housing 24 of the locking means 20 so that they can rotate around the corresponding swiveling axis S1, S2. The housing 24—as visible in FIGS. 1 and 4—seen in the transverse direction Q of the vehicle—is centrally located. The housing 24—as visible in FIGS. 2 and 3—seen in the longitudinal direction L of the vehicle—is located in the center of the associated positioning channel 8c, 8d, 8e. The locking pawls 22a, 22b are located on the outer end of the shafts 23a, 23b associated with the vehicle outer sides of the tugger train trailer 1. The outer ends of the shafts 23a, 23b are also rotationally mounted in bearing blocks 25a, 25b.

The locking means 20 are always located on the upper side of the platform 8.

Figure 4:
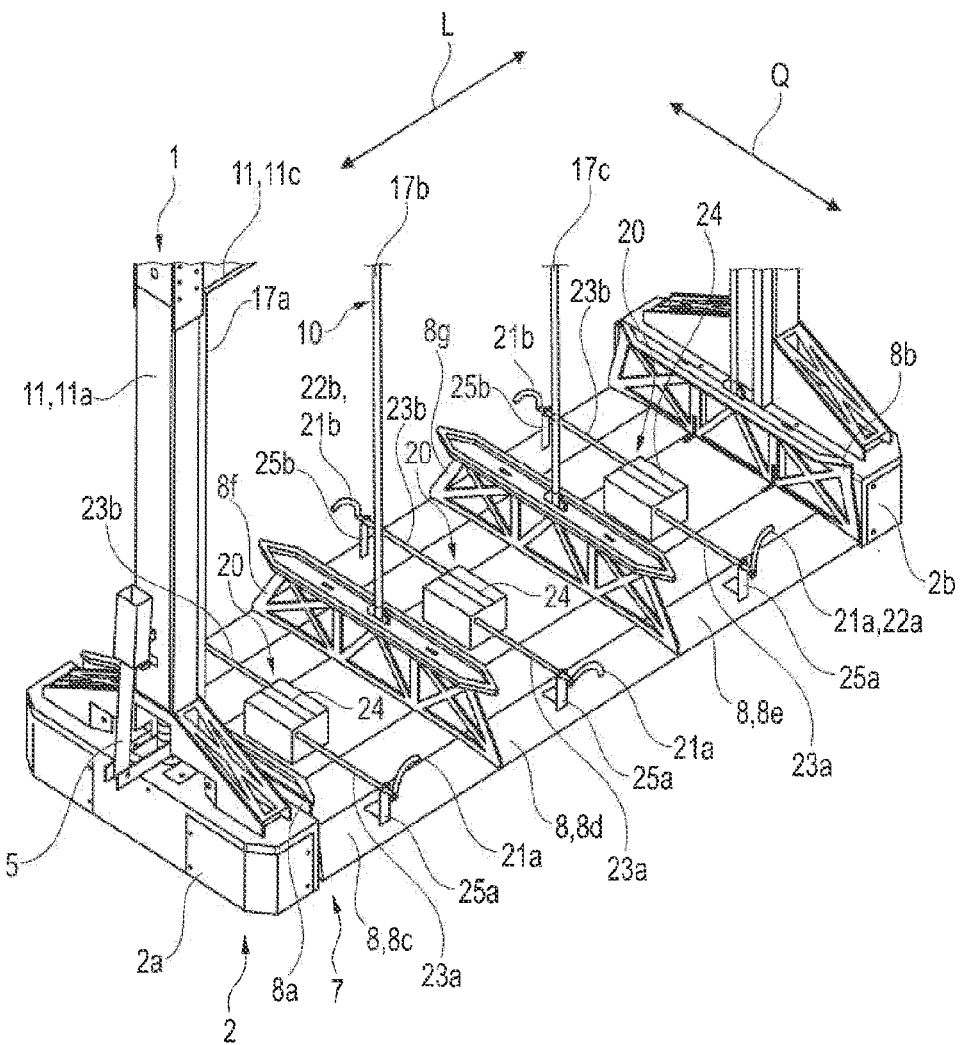
FIG. 4 shows the tugger train trailer from FIG. 1 with the locking means in the unlocked position.

Each locking element 21a and 21b respectively of the corresponding locking means 20 can be actuated between a locked position and an unlocked position. In FIGS. 1 to 3, all the locking elements 21a, 21b are in the locked position. The positioning channels 8c, 8d, 8e are therefore each locked on both sides. In FIG. 4, the locking elements 21a or 21b respectively of the locking means 20 of the positioning channels 8c, 8e are in the locked position, so that the positioning channels 8c, 8e are each locked on both sides. On the positioning channel 8d, the locking element 21b located on the right side of the vehicle is in the locked position and the locking element 21a located on the left side of the vehicle is in the unlocked position, so that the positioning channel 8d is opened on one side on the left side of the vehicle to slide in a cargo carrier on the platform of the positioning channel 8d.

Figure 5:
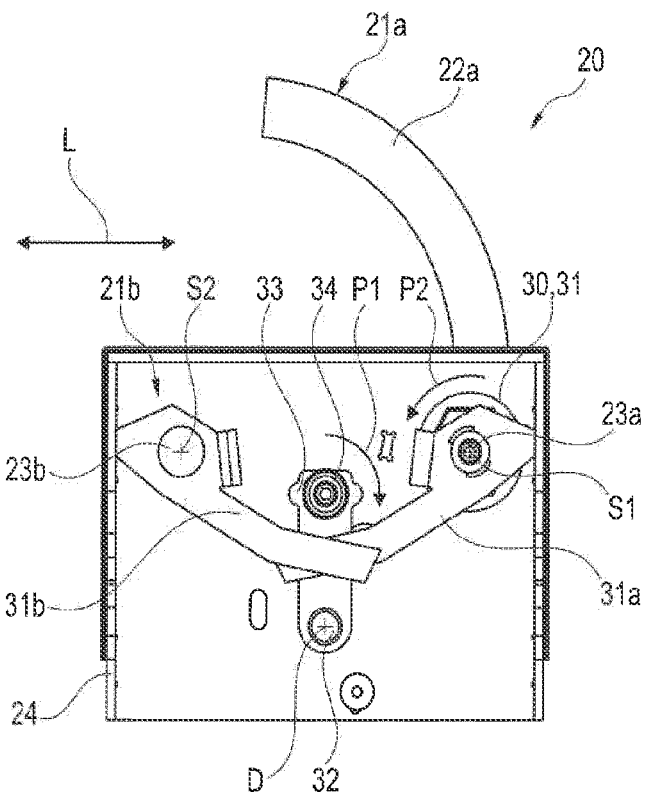
FIG. 5 is a detail of the tugger train trailer with a sectional view of the locking means, wherein the locking means are in the locked position.
Figure 6:
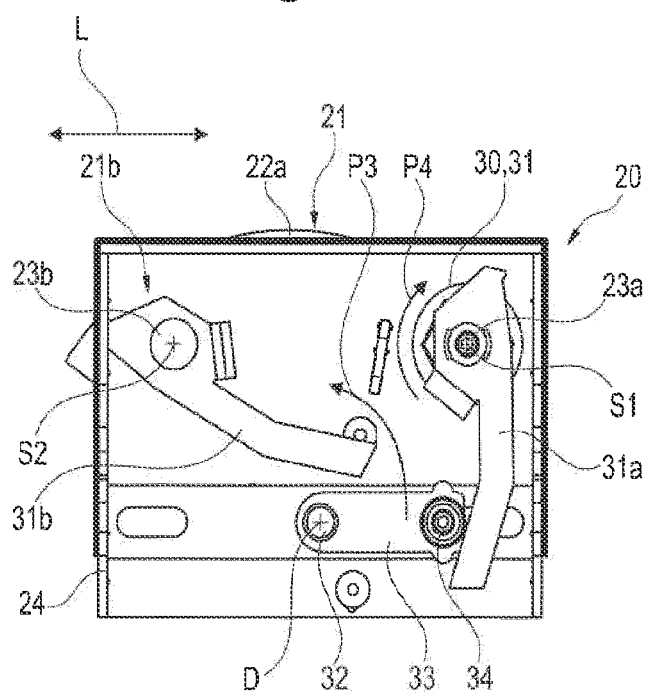
FIG. 6 is an illustration according to FIG. 5, wherein the locking means are in the unlocked position.

The construction of locking means 20 according to the invention, which in the illustrated exemplary embodiment has two locking elements 21a, 21b, is described in greater detail below with reference to FIGS. 5 and 6. FIGS. 5 and 6 show a section through the housing 24 of the locking means 20 along the section line A-A in FIG. 1.

In FIGS. 5, 6, the inner ends of the two shafts 23a, 23b of the locking elements 21a, 21b are shown, which are mounted so that they can swivel around the swiveling axis S1 or S2 respectively, as well as the locking pawl 22a located on the outer shaft end of the shaft 23a. In FIG. 5, the locking pawl 22a is in the locked position. In FIG. 6, the locking pawl 22a is in the unlocked position.

Each locking element 21a, 21b of the locking means 20 can be electromechanically actuated between the locked position and the unlocked position. The locking element 21a, 21b is for this purpose actuated by a spring device 30 toward the locked position and is actuated into the unlocked position by means of an electric drive device, such as an electric motor, for example, which is located in the housing 24 and is not shown in any greater detail in the Figures.

The spring device 30 is a torsion spring, such as a helical spring, for example, located on the corresponding shaft 23a or 23b respectively. FIGS. 5 and 6 show the spring device 30 of the locking element 21a acting on the shaft 23a. The spring device 30 of the locking element 21b acting on the shaft 23a is not shown in any greater detail.

Each locking element 21a, 21b has an actuator lever 31a, 31b non-rotationally fastened to the shaft 23a, 23b which can be actuated by means of the electric drive device.

The electric drive device not illustrated in any greater detail in FIGS. 5 and 6, and which is installed in the housing 24, has a drive shaft 32 that can rotate around an axis of rotation D, to which an actuator pawl 33 is non-rotationally fastened, with which the actuator lever 31a or 31b of the locking element 21a or 21b respectively can be actuated.

The actuator pawl 33 can be swiveled by the drive device between a starting position (FIG. 5) and an actuation position (FIG. 6). In the starting position of the actuator pawl 33 illustrated in FIG. 5, the locking elements 21a, 21b can be actuated by means of the corresponding spring device 30 into the locked position. In the actuating position of the actuator pawl 33 illustrated in FIG. 6, the locking element 21a can be actuated into the unlocked position by means of the electric drive device. It goes without saying that the actuator pawl 33 has an additional actuation position in which the locking element 21b is impinged by means of the electric drive device into the unlocked position.

The drive shaft 32 of the electric drive device is oriented parallel to the shafts 23a, 23b of the locking elements 21a, 21b.

The two shafts 23a, 23b of the locking elements 21a, 21b that can be actuated by the electric drive device into the unlocked position are oriented in the longitudinal direction L of the vehicle of the tugger train trailer at some distance from each other. The drive shaft 32 of the electric drive device—viewed in the longitudinal direction L of the vehicle—is located midway between the shafts 23a, 23b of the locking elements 21a, 21b.

In the illustrated exemplary embodiment, the actuator pawl 33 is provided with an actuator roller 34 located rotationally on the actuator pawl 33, which comes into contact with the corresponding actuator levers 31a, 31b of the locking elements 21a, 21b for their actuation.

In the illustrated exemplary embodiment, the locking pawls 22a, 22b are in the shape of a circular arc. In this embodiment, the locking pawls 22a, 22b are curved vertically downward.

For the control of the electric drive device of the respective locking means 20, at least one respective control element, in particular a momentary-contact switch, is provided. The electric drive device is controlled as a function of the control element so that when the control element is actuated, the electric drive device actuates the respective locking element 21a or 21b into the unlocked position. For this purpose, the electric drive device is controlled as a function of the control element so that when the control element is actuated, the electric drive device swivels the actuator pawl 33 into the corresponding actuation position. In the illustrated exemplary embodiment, in which the electric drive device actuates the two locking elements 21a, 21b, preferably two control elements are provided, whereby in the event of an actuation of a first control element, the locking element 21a is actuated by the electric drive motor into the unlocked position and in the event of an actuation of a second control element, the locking element 21b is actuated by the electric drive motor into the unlocked position. The corresponding locking element 21a, 21b is therefore unlocked electrically by a corresponding control of the electric drive device into the corresponding actuation position of the actuator pawl 33.

On the locking means 20 according to the invention, the locking process of the corresponding locking element 21a, 21b is performed by sliding the cargo carrier into the corresponding positioning channels 8c, 8d, 8e.

For this purpose, a sensor device not illustrated in any greater detail in the Figures is provided, which detects a certain insertion position of the cargo carrier. The electric drive device is controlled as a function of the sensor device so that the locking element 21a, 21b can be actuated by the spring device 30 toward the locked position. For this purpose the electric drive device is controlled as a function of the sensor device so that the electric drive device swivels the actuator pawl 33 back into the starting position illustrated in FIG. 5.

The sensor device is preferably a photoelectric barrier, which is located centrally in the transverse direction Q of the vehicle of the tugger train trailer 1. The sensor device therefore detects when a cargo carrier is located in the middle of the corresponding positioning channel 8c or 8d or 8e, or is pushed up to the center of the positioning channel 8c or 8d or 83 respectively.

Figure 7:
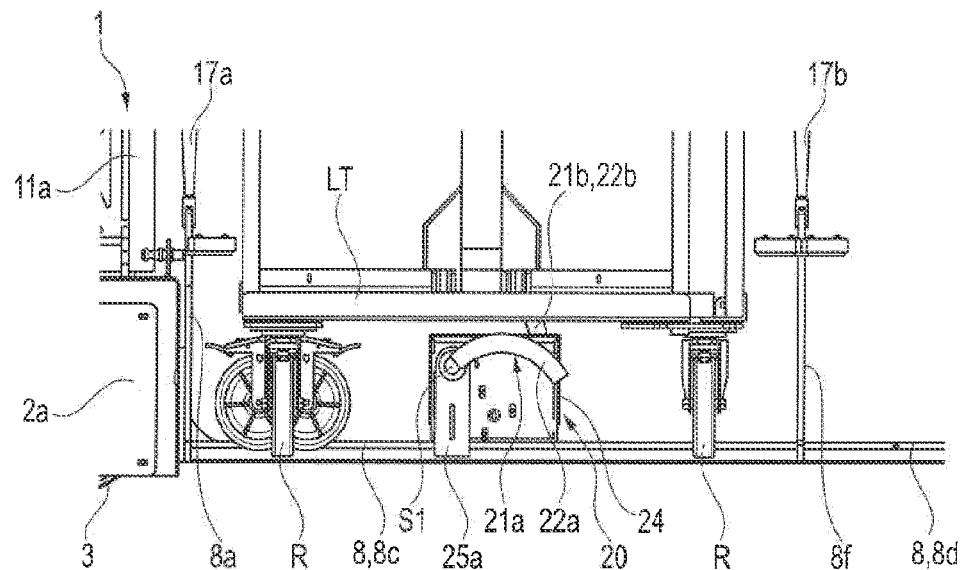
FIG. 7 is a detail of a tugger train trailer according to the invention with a cargo carrier slid in during the first half of the insertion path of the cargo carrier with a locking element in the unlocked position.
Figure 8:
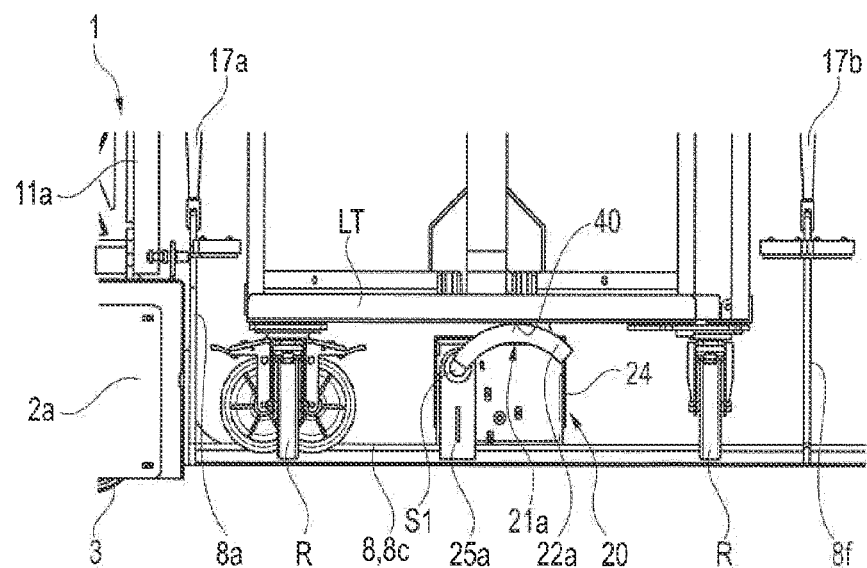
FIG. 8 shows the tugger train trailed of FIG. 7 during the second half of the insertion path of the cargo carrier.
Figure 9:
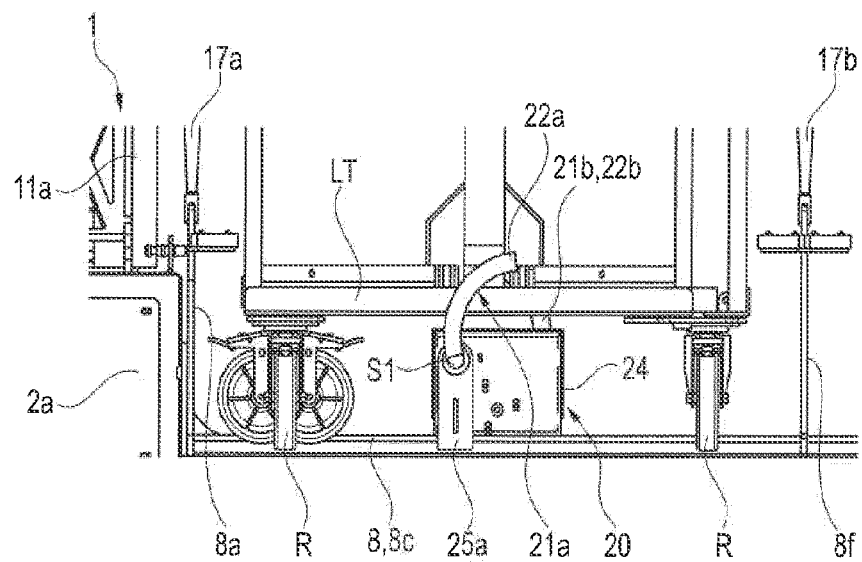
FIG. 9 shows the tugger train of FIGS. 7 and 8 with a cargo carrier inserted all the way and a locking element in the locking position.

The function of the locking means 20 according to the invention is explained below with reference to FIGS. 5 to 9. In FIGS. 7 to 9, the insertion of a cargo carrier LT provided with rollers R into the positioning channel 8c is illustrated from the left side of the vehicle of the tugger train trailer 1.

In FIG. 5, the actuator pawl 33 of the drive shaft 32 of the electric drive device is in the starting position and is oriented vertically. the actuator roller 34 located on the actuator pawl 33 has no contact with the two actuator levers 31a, 31b, so that both locking elements 21a, 21b are actuated by the corresponding spring devices 30 into the respective locked position, in which the two locking pawls 22a, 22b are pivoted upward. The position illustrated in FIG. 5 represents the base position of the locking means 20. Because the actuator roller 34 located on the actuator pawl 33 has no contact with the two actuator levers 31a, 31b, in the home position the electric drive device is free of any load.

To actuate the locking element 21a into the unlocked position and thereby open the positioning channel 8c or 8d or 8e on the left side of the vehicle, the electric drive device is controlled so that drive device rotates the drive shaft 32 with the actuator pawl 33 clockwise by angle of rotation of 90° into the actuation position, as illustrated in FIG. 5 by the arrow P1. The actuator pawl 33 thereby comes in contact by means of the actuator roller 34 with the actuator lever 31a of the locking element 21a and pivots the actuator level 31a and thus the shaft 23a counterclockwise against the force of the spring device 30, as indicated in FIG. 5 by the arrow P2, so that the locking pawl 22a pivots downward into the unlocked position of the locking element 21a. This status, in which the actuator pawl 33 is swiveled clockwise by an angle of rotation of 90° into the actuation position and the actuator lever 31a of the locking element 21a is actuated so that the locking element 21a is in the unlocked position, is illustrated in FIG. 6. The actuator lever 31b of the locking element 21b—as visible in FIG. 6—is not actuated, so that the locking element 21b and the locking pawl 22b are still in the locked position.

As visible in FIG. 6, in the actuation position of the actuator pawl 33, the actuator lever 31a is above the top dead center point of the actuator pawl 33, so that the electric drive device is also free of any load in the actuation position illustrated in FIG. 6. The electric drive device therefore requires energy only to pivot the actuator pawl 33 from the starting position into the actuation position.

FIG. 7 shows the positioning channel 8c with the locking means 20 in the position shown in FIG. 6, in which the locking pawl 22a of the locking element 21a is swiveled downward into the unlocked position, and the positioning channel 8c on the left side of the vehicle of the tugger train trailer 1 is opened and the locking element 21b and the locking pawl 22b remain in the locked position. The cargo carrier LT can therefore be pushed into the opened positioning channel 8c on the left side of the vehicle of the tugger train trailer 1 with its rollers R onto the platform 8 of the positioning channel 8c. Because the locking means 20 are located centrally, in the longitudinal direction of the vehicle L, in the positioning channel 8c, the locking means 20 are located between the rollers R of the cargo carrier LT, so that the cargo carrier LT passes over the locking pawl 22a swiveled downward and in the unlocked position and the housing 24.

As soon as the cargo carrier LT is inserted in the transverse direction Q of the tugger train trailer 1 to the middle of the vehicle of the tugger train trailer 1, the cargo carrier LT breaks the photoelectric barrier, as a result of which the electric drive device is controlled so that the actuator pawl 33 is pivoted counterclockwise—as indicated in FIG. 6 by the arrow P3—back into the vertical starting position. The actuator lever 31a and the shaft 23a of the locking element 21a are pivoted by the spring device 30 clockwise—as indicated in FIG. 6 by arrow P4—and thus the locking element 21a is actuated by the spring device 30 toward the locked position. The circular-arc-shaped locking pawl 22a—as illustrated in FIG. 8—comes into contact with a contact face 40 located on the underside of the cargo carrier LT which prevents the further pivoting of the locking pawl 22a downward into the locked position, so that the locking pawl 22a is in a middle position between the locked position and the unlocked position. The cargo carrier LT can then be inserted farther in the transverse direction Q of the vehicle into the positioning channel 8c, whereby the locking pawl 22a slides along the contact face 40, and thus the cargo carrier LT slides over the locking pawl 22 which is in the middle position, until the cargo carrier LT is inserted all the way and makes contact with the front end of the locking element 21b which is in the locked position on the right side of the vehicle of the tugger train trailer 1. In the fully inserted position, the locking pawl 22a is no longer in any contact with the contact face 40, so that the locking pawl 22a is pivoted by the spring device 30 farther upward into the locked position, and the fully inserted cargo carrier LT, which is thus in the loaded position, is locked on the rear end, as illustrated in FIG. 9. In the loaded position, the cargo carrier LT inserted into the positioning channel 8c is secured in the transverse direction Q of the tugger train trailer by the two locking pawls 22a, 22b which are in the locked position.

If the cargo carrier LT is pushed in from the right side of the vehicle of the tugger train trailer 1—to actuate the locking element 21b into the unlocked position and thereby to open the positioning channel 8c, 8d or 8e on the right side of the vehicle—the electric drive device is controlled so that the drive device rotates the drive shaft 32 with the actuator pawl 33 from the starting position illustrated in FIG. 5 in the counterclockwise direction by an angle of rotation of 90° into a second actuator position in which the actuator pawl 33 comes in contact by means of the actuator roller 34 with the actuator lever 31b of the locking element 21b and swivels the actuator lever 31b and thus the shaft 23b clockwise against the force of the spring device 30 so that the locking pawl 22b is pivoted downward into the unlocked position of the locking element 21b.

The invention claimed is:

1. A tugger train trailer comprising a chassis and a transport device to receive at least one cargo carrier having rollers wherein the tugger train trailer comprises at least one locking means, which secures the received cargo carrier in a transverse direction of a vehicle of the tugger train trailer, wherein the locking means has a locking element that can be electromechanically actuated between a locked position and an unlocked position, and wherein the locking element is actuated by a spring device toward the locked position and into the unlocked position by an electric drive device,
   wherein the locking means has two locking elements, which are associated with opposite sides of the vehicle of the tugger train trailer, and
   wherein shafts of the locking elements are located separately from each other and a drive shaft of the drive device is located in the middle between the shafts of the locking elements.

2. The tugger train trailer according to claim 1, wherein the locking element has a locking pawl which is located on a shaft mounted so as to swivel around a swiveling axis.

3. The tugger train trailer according to claim 2, wherein the swiveling axis of the shaft is oriented in the transverse direction of the vehicle.

4. The tugger train trailer according to claim 2, wherein the spring device is a torsion spring located on the shaft.

5. The tugger train trailer according to claim 2, wherein the locking element has an actuator lever located on the shaft, which can be actuated by the electric drive device.

6. The tugger train trailer according to claim 2, wherein the electric drive device has an actuator pawl located on a drive shaft of the drive device, with which the shaft of the locking element and the actuator lever of the locking element can be actuated.

7. The tugger train trailer according to claim 6, wherein the actuator pawl can be swiveled by the drive device between a starting position and an actuation position, wherein in the starting position of the actuator pawl, the locking element can be actuated by the spring device into the locked position and in the actuation position of the actuator pawl, the locking element is in the unlocked position.

8. The tugger train trailer according to claim 6, wherein the drive shaft of the drive device is oriented parallel to the shaft of the locking element.

9. The tugger train trailer according to claim 6, wherein the actuator pawl is provided with a rotatable actuator roller, with which the actuator lever of the locking element can be actuated.

10. The tugger train trailer according to claim 2, wherein the locking pawl is in the shape of a circular arc.

11. The tugger train trailer according to claim 1, wherein the two locking elements can be actuated into the respective unlocked position by the electric drive device.

12. The tugger train trailer according to claim 1, wherein a control element is provided, wherein the electric drive device is controlled as a function of the control element so that the electric drive device actuates the locking element into the unlocked position when the control element is actuated.

13. The tugger train trailer according to claim 12, wherein the electric drive device is controlled by the control element so that when the control element is actuated, the electric drive pivots an actuator pawl into the actuation position.

14. The tugger train trailer according to claim 1, wherein a sensor device is provided for a detection of an insertion position of the cargo carrier, and the electric drive device is controlled as a function of the sensor device so that the locking element can be actuated toward the locked position.

15. The tugger train trailer according to claim 14, wherein the electric drive device is controlled as a function of the sensor device so that the electric drive swivels an actuator pawl into the starting position.

16. The tugger train trailer according to claim 14, wherein the sensor device is a photoelectric barrier.

17. The tugger train trailer according to claim 14, wherein the sensor device is located centrally in the transverse direction of the vehicle.

18. The tugger train trailer according to claim 1, wherein to receive the at least one cargo carrier, the tugger train trailer has a transport device that can be raised and lowered with respect to the chassis.

19. The tugger train trailer according to claim 18, wherein the transport device has a platform onto which the rollers of the cargo carrier can be driven.

20. The tugger train trailer according to claim 19, wherein the locking means are located on the platform.

21. A system comprising a tugger train trailer according to claim 1, and at least one cargo carrier having rollers, wherein the cargo carrier has a contact face on the underside for the locking element.

* * * * *